(12) United States Patent
Liu et al.

(10) Patent No.: US 10,983,640 B2
(45) Date of Patent: Apr. 20, 2021

(54) POSITION DETECTION CIRCUIT AND POSITION DETECTION METHOD IN WHICH LINE ELECTRODE OF CAPACITIVE TOUCH SENSOR IS DETERMINED TO BE ANOMALOUS OR POSSIBLY ANOMALOUS

(71) Applicant: Wacom Co., Ltd., Saitama (JP)

(72) Inventors: JuiMin Liu, Tokyo (JP); Yuhi Hatano, Chiba (JP); Shigeyuki Sano, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 76 days.

(21) Appl. No.: 16/256,833

(22) Filed: Jan. 24, 2019

(65) Prior Publication Data

US 2019/0258337 A1 Aug. 22, 2019

Related U.S. Application Data

(60) Provisional application No. 62/634,027, filed on Feb. 22, 2018.

(30) Foreign Application Priority Data

Oct. 3, 2018 (JP) .............................. JP2018-187901

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ...... G06F 3/044; G06F 3/0412; G06F 3/0446; G06F 3/04186; G06F 3/0418; G06F 3/0445
See application file for complete search history.

(56) References Cited

U.S. PATENT DOCUMENTS

| 2010/0207607 | A1* | 4/2010 | Katsurahira | ........ G06F 3/03545 |
| | | | | 324/207.11 |
| 2011/0050617 | A1* | 3/2011 | Murphy | ................. G06F 3/0418 |
| | | | | 345/174 |
| 2016/0124575 | A1* | 5/2016 | Yashiro | ................. G06F 3/0418 |
| | | | | 345/173 |
| 2019/0079613 | A1* | 3/2019 | Zhang | ................... G06F 3/0412 |

FOREIGN PATENT DOCUMENTS

JP 2014-215843 A 11/2014

\* cited by examiner

*Primary Examiner* — Kwang-Su Yang
(74) *Attorney, Agent, or Firm* — Seed IP Law Group LLP

(57) ABSTRACT

A position detection circuit is connected to a capacitive touch sensor that includes a plurality of line electrodes arranged in a two-dimensional lattice pattern. The position detection circuit includes: at least one processor device; and at least one memory device storing processor-executable instructions which, when executed by the processor device, cause the position detection circuit to: acquire capacitance-related detection values at crossing points of the line electrodes in association with positions of the crossing points; calculate a number of crossing points at which a detection value is smaller than a first threshold for each of the line electrodes; and determine that one or more of the line electrodes for which a calculated number of crossing points is greater than a second threshold are anomalous or possibly anomalous.

12 Claims, 13 Drawing Sheets

FIG. 4

|  | X0 | X1 | X2 | X3 | X4 | X5 | X6 | X7 | X8 | X9 | X10 | X11 | X12 | X13 | X14 | EPC | E_flag |
|---|---|---|---|---|---|---|---|---|---|---|---|---|---|---|---|---|---|
| Y0 | 18 | 21 | 20 | 18 | 18 | 19 | 19 | 19 | 19 | 19 | 21 | 21 | 19 | 21 | 19 | 3 | 0 |
| Y1 | 20 | 19 | 18 | 18 | 19 | 18 | 21 | 21 | 20 | 22 | 21 | 22 | 18 | 22 | 20 | 4 | 0 |
| Y2 | 20 | 20 | 18 | 21 | 21 | 21 | 21 | 18 | 22 | 22 | 18 | 20 | 22 | 21 | 20 | 3 | 0 |
| Y3 | 22 | 21 | 22 | 22 | 19 | 21 | 20 | 22 | 18 | 18 | 20 | 19 | 19 | 18 | 19 | 3 | 0 |
| Y4 | 19 | 18 | 19 | 22 | 18 | 18 | 21 | 18 | 20 | 21 | 19 | 19 | 20 | 22 | 19 | 4 | 0 |
| Y5 | 19 | 22 | 20 | 20 | 21 | 22 | 20 | 18 | 22 | 20 | 22 | 20 | 22 | 22 | 18 | 2 | 0 |
| Y6 | 20 | 22 | 20 | 19 | 19 | 21 | 18 | 22 | 22 | 22 | 22 | 19 | 21 | 19 | 19 | 1 | 0 |
| Y7 | 21 | 20 | 18 | 22 | 22 | 19 | 22 | 19 | 21 | 20 | 22 | 20 | 22 | 22 | 20 | 1 | 0 |
| Y8 | 12 | 11 | 11 | 11 | 13 | 14 | 12 | 10 | 10 | 14 | 14 | 14 | 14 | 13 | 11 | 15 | 1 |
| Y9 | 18 | 22 | 18 | 22 | 18 | 19 | 19 | 21 | 19 | 19 | 19 | 19 | 22 | 18 | 18 | 6 | 0 |
| Y10 | 18 | 19 | 18 | 22 | 22 | 18 | 18 | 18 | 20 | 18 | 20 | 21 | 19 | 19 | 21 | 6 | 0 |
| Y11 | 18 | 21 | 18 | 20 | 20 | 20 | 22 | 22 | 19 | 22 | 19 | 18 | 21 | 18 | 19 | 4 | 0 |
| Y12 | 22 | 19 | 19 | 19 | 18 | 19 | 19 | 21 | 21 | 21 | 19 | 20 | 19 | 18 | 22 | 3 | 0 |
| Y13 | 22 | 21 | 21 | 18 | 20 | 18 | 18 | 21 | 20 | 22 | 20 | 21 | 22 | 22 | 19 | 3 | 0 |
| Y14 | 20 | 22 | 22 | 20 | 21 | 20 | 18 | 20 | 18 | 21 | 21 | 22 | 22 | 21 | 21 | 2 | 0 |
|  |  |  |  |  |  |  |  |  |  |  |  |  |  |  |  | ELC | 1 |
| EPC | 5 | 3 | 7 | 4 | 5 | 6 | 5 | 5 | 3 | 3 | 2 | 2 | 2 | 6 | 3 | ELC |  |
| E_flag | 0 | 0 | 0 | 0 | 0 | 0 | 0 | 0 | 0 | 0 | 0 | 0 | 0 | 0 | 0 |  | 0 |

FIG. 5

|  | X0 | X1 | X2 | X3 | X4 | X5 | X6 | X7 | X8 | X9 | X10 | X11 | X12 | X13 | X14 | EPC | E_flag |
|---|---|---|---|---|---|---|---|---|---|---|---|---|---|---|---|---|---|
| Y0 | 21 | 19 | 20 | 21 | 21 | 21 | 19 | 22 | 11 | 22 | 20 | 20 | 22 | 20 | 22 | 1 | 0 |
| Y1 | 22 | 20 | 21 | 18 | 19 | 20 | 21 | 19 | 11 | 18 | 19 | 18 | 20 | 21 | 22 | 4 | 0 |
| Y2 | 21 | 22 | 22 | 20 | 20 | 19 | 22 | 19 | 11 | 22 | 20 | 20 | 22 | 18 | 21 | 2 | 0 |
| Y3 | 18 | 19 | 22 | 20 | 19 | 19 | 20 | 21 | 13 | 20 | 19 | 18 | 22 | 21 | 19 | 3 | 0 |
| Y4 | 21 | 19 | 21 | 20 | 19 | 21 | 18 | 19 | 12 | 18 | 21 | 19 | 19 | 21 | 21 | 3 | 0 |
| Y5 | 21 | 18 | 18 | 22 | 22 | 18 | 20 | 18 | 10 | 21 | 20 | 21 | 18 | 19 | 20 | 6 | 0 |
| Y6 | 18 | 22 | 21 | 18 | 21 | 18 | 22 | 19 | 11 | 22 | 19 | 19 | 21 | 22 | 19 | 4 | 0 |
| Y7 | 19 | 20 | 20 | 20 | 19 | 19 | 20 | 19 | 14 | 22 | 20 | 19 | 21 | 19 | 20 | 1 | 0 |
| Y8 | 10 | 12 | 12 | 14 | 12 | 12 | 13 | 10 | 14 | 10 | 14 | 10 | 11 | 10 | 13 | 15 | 1 |
| Y9 | 11 | 10 | 12 | 14 | 10 | 11 | 14 | 14 | 12 | 14 | 12 | 12 | 11 | 11 | 14 | 15 | 1 |
| Y10 | 11 | 14 | 11 | 14 | 14 | 12 | 13 | 12 | 10 | 12 | 13 | 12 | 14 | 10 | 13 | 15 | 1 |
| Y11 | 20 | 20 | 22 | 19 | 22 | 19 | 21 | 20 | 11 | 18 | 19 | 22 | 21 | 19 | 22 | 2 | 0 |
| Y12 | 18 | 20 | 21 | 22 | 19 | 22 | 18 | 20 | 13 | 19 | 19 | 20 | 19 | 21 | 21 | 3 | 0 |
| Y13 | 19 | 18 | 20 | 19 | 22 | 18 | 18 | 19 | 14 | 19 | 22 | 20 | 20 | 20 | 19 | 4 | 0 |
| Y14 | 18 | 21 | 20 | 20 | 20 | 21 | 21 | 18 | 11 | 18 | 18 | 18 | 21 | 18 | 21 | 7 | 0 |
|  |  |  |  |  |  |  |  |  |  |  |  |  |  |  |  | ELC | 3 |
| EPC | 7 | 5 | 4 | 5 | 3 | 6 | 6 | 5 | 15 | 7 | 4 | 6 | 4 | 5 | 3 | ELC |  |
| E_flag | 0 | 0 | 0 | 0 | 0 | 0 | 0 | 0 | 1 | 0 | 0 | 0 | 0 | 0 | 0 |  | 1 |

FIG. 6

(COMPARATIVE EXAMPLE)

(COMPARATIVE EXAMPLE)

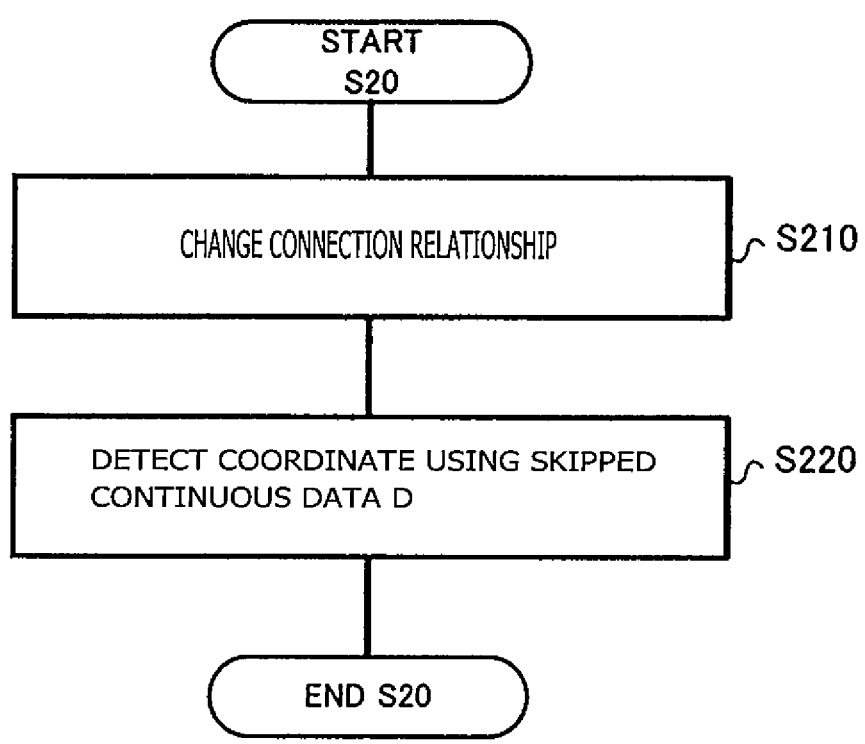

(EXAMPLE)

(EXAMPLE)

(EXAMPLE)

(EXAMPLE)

POSITION DETECTION CIRCUIT AND POSITION DETECTION METHOD IN WHICH LINE ELECTRODE OF CAPACITIVE TOUCH SENSOR IS DETERMINED TO BE ANOMALOUS OR POSSIBLY ANOMALOUS

BACKGROUND

Technical Field

The present technology relates to a position detection circuit and a position detection method.

Background Art

Patent Literature 1 "Japanese Patent No. 2014-215843" discloses a method for displaying an inspection pattern indicating a guidance route for a touch operation and deciding the presence or absence of a touch sensor error in accordance with a locus of detection points formed as a result of touch operation by an inspector.

However, the method disclosed in Patent Literature 1 "Japanese Patent No. 2014-215843" has a problem in that it may not be used under normal usage conditions because of the need to display an inspection pattern in advance.

BRIEF SUMMARY

It is desirable to provide a position detection circuit and a position detection method for deciding whether there is any anomaly in line electrodes by a simple method without displaying a special inspection pattern.

A position detection circuit of a first embodiment of the present technology is a circuit connected to a capacitive touch sensor that includes a plurality of line electrodes arranged in a two-dimensional lattice pattern. The position detection circuit includes at least one processor device; and at least one memory device storing processor-executable instructions which, when executed by the processor device, cause the position detection circuit to perform an acquisition, a calculation, and a determination. The acquisition acquires capacitance-related detection values at crossing points of the line electrodes in association with positions of the crossing points. The calculation calculates a number of the crossing points at which a detection value is smaller than a first threshold for each of the line electrodes. The determination determines that the line electrodes for which a calculated number of crossing points is greater than a second threshold are anomalous or possibly anomalous.

A position detection method of a second embodiment of the present technology is performed using a capacitive touch sensor that includes a plurality of line electrodes arranged in a two-dimensional lattice pattern, and one or a plurality of processors perform an acquisition, a calculation, and a determination. The acquisition acquires capacitance-related detection values at crossing points of the line electrodes in association with positions of the crossing points. The calculation calculates a number of crossing points at which the detection value is smaller than a first threshold for each of the line electrodes. The determination determines that one or more of the line electrodes for which a calculated number of crossing points calculated is greater than a second threshold are anomalous or possibly anomalous.

The present technology detects whether line electrodes are anomalous by a simple method without displaying a special inspection pattern.

BRIEF DESCRIPTION OF THE DRAWINGS

FIG. 4 is a diagram illustrating a first example of results acquired by a provisional decision process;

FIG. 5 is a diagram illustrating a second example of results acquired by the provisional decision process;

FIG. 6 is a diagram illustrating an example of results acquired by a majority decision process;

FIG. 9 is a detailed flowchart of a pen coordinate derivation process using skipped continuous line data performed at S20 of FIG. 2;

DETAILED DESCRIPTION OF THE PREFERRED EMBODIMENTS

A description will be given below of a position detection circuit and a position detection method of the present technology with reference to the attached drawings. The present technology is not limited to the embodiment and its modification example described below, and it is a matter of course that the present technology may be modified as desired without departing from the gist of the present technology. Alternatively, different configurations may be combined to the extent that no technical inconsistency arises.

[Configuration of the Electronic Equipment 10]

Figure 1:
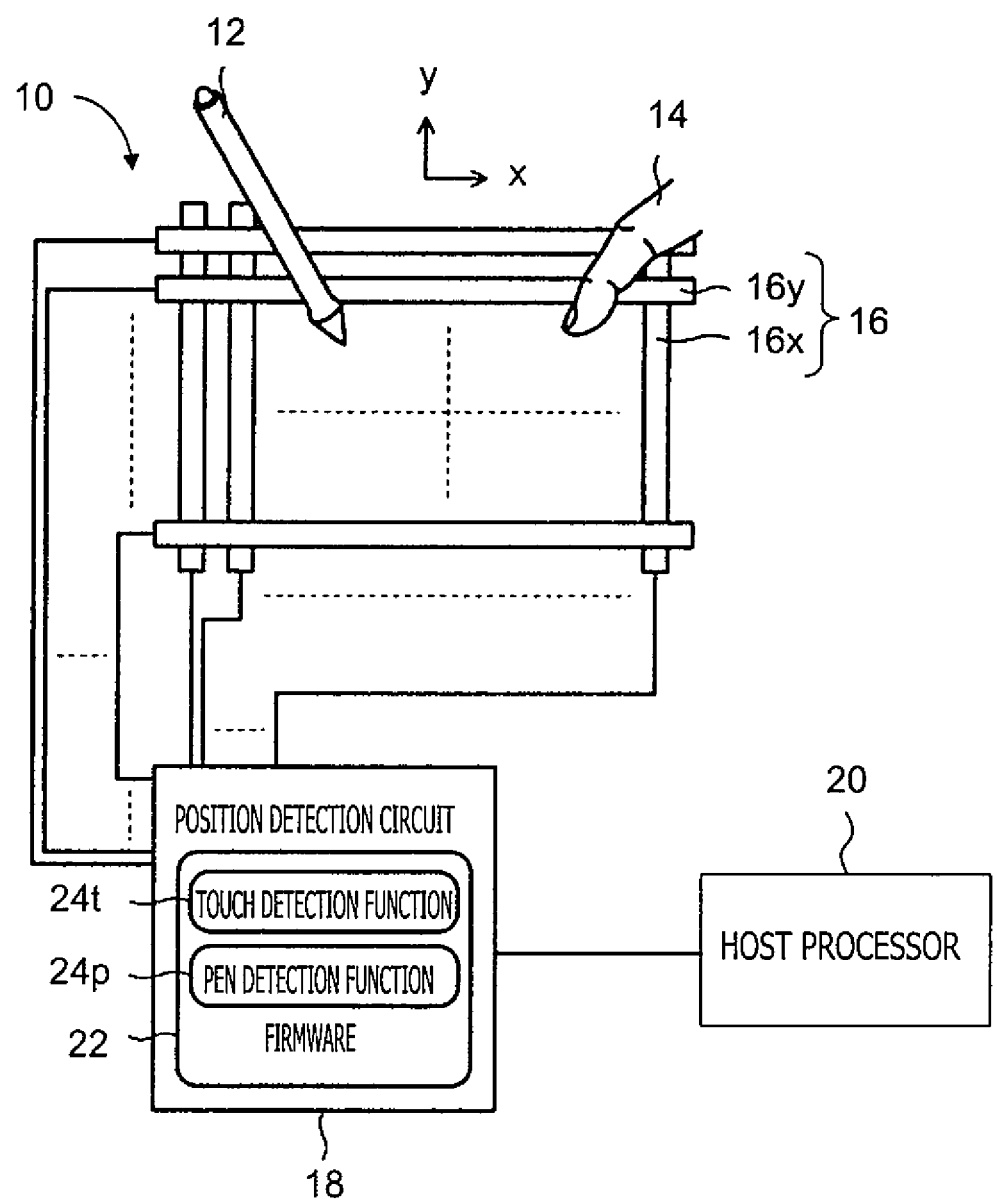
FIG. 1 is a schematic block diagram of electronic equipment incorporating a position detection circuit of an embodiment of the present technology.

FIG. 1 is a schematic block diagram of electronic equipment 10 incorporating a position detection circuit 18 of an embodiment of the present technology. The electronic equipment 10 includes, for example, a tablet terminal, a smartphone, or a personal computer. A user writes a picture or text to the electronic equipment 10 by holding an electronic pen 12 (or stylus) in his or her hand and moving a tip of the pen while pressing the pen against a touch surface of a display panel (not depicted). Alternatively, the user performs a desired operation via a user control being displayed by bringing his or her own finger 14 into contact with the touch surface.

This electronic equipment 10 includes a touch sensor 16, a position detection circuit 18, and a host processor 20. x and y directions illustrated in the present figure are equivalent to X and Y axes of a Cartesian coordinate system defined in a plane that includes the touch sensor 16.

The touch sensor 16 includes a plurality of electrodes arranged on a display panel. The touch sensor 16 includes a plurality of line electrodes 16x for detecting an X coordinate (position in the x direction) and a plurality of line electrodes 16y for detecting a Y coordinate (position in the y direction). The plurality of line electrodes 16x extend in the y direction and are arranged at equal intervals along the x direction. The plurality of line electrodes 16y extend in the x direction and are arranged at equal intervals along the y direction. The intervals at which the line electrodes 16x (16y) are arranged may be hereinafter referred to as "pitches."

A position detection circuit 18 is an integrated circuit configured to execute firmware 22 and connected to the plurality of electrodes included in the touch sensor 16. For example, the position detection circuit 18 includes at least one processor device coupled to at least one memory device storing processor-executable instructions which, when executed by the processor device, cause the position detection circuit 18 to operate as described herein. The firmware 22 is configured to realize a touch detection function 24t for detecting a touch with the user's finger 14 or other object and a pen detection function 24p for detecting states of the electronic pen 12.

The touch detection function 24t includes, for example, a two-dimensional scanning function of the touch sensor 16, a heat map (two-dimensional position distribution of detected levels) generation function on the touch sensor 16, and a region classification function (e.g., classification between fingers and palm) on the heat map. The pen detection function 24p includes, for example, the two-dimensional scanning function of the touch sensor 16, a downlink signal reception/analysis function, an estimation function regarding the states (e.g., position, attitude, pen pressure) of the electronic pen 12, a generation/transmission function of an uplink signal including an instruction to the electronic pen 12.

A host processor 20 is a processor that includes a CPU (Central Processing Unit) or a GPU (Graphics Processing Unit). The host processor 20 reads and executes the program stored in a memory which is not illustrated, thereby performing a digital ink generation process using data from the position detection circuit 18 and a visualization process for displaying details of a drawing represented by the digital ink.

[Schematic Operation of the Position Detection Circuit 18]

In the case where the touch sensor 16 includes N rows of the line electrodes 16x and M columns of the line electrodes 16y, there are N×M intersections (hereinafter referred to as crossing points). In the description given below, "row lines" refer to the electrodes in a row direction, and "column lines" refer to the electrodes in a column direction, and "lines" refer to the electrodes in either or both of the row and column directions.

The position detection circuit 18 detects the position of the finger 14 by grasping a change in capacitance at each crossing point. The position detection circuit 18 detects the states of the electronic pen 12 on the basis of signal levels from the electronic pen 12 detected in the respective directions of the line electrodes 16x and 16y. A capacitance-related detection value may be mutual capacitance or self-capacitance.

Figure 2:
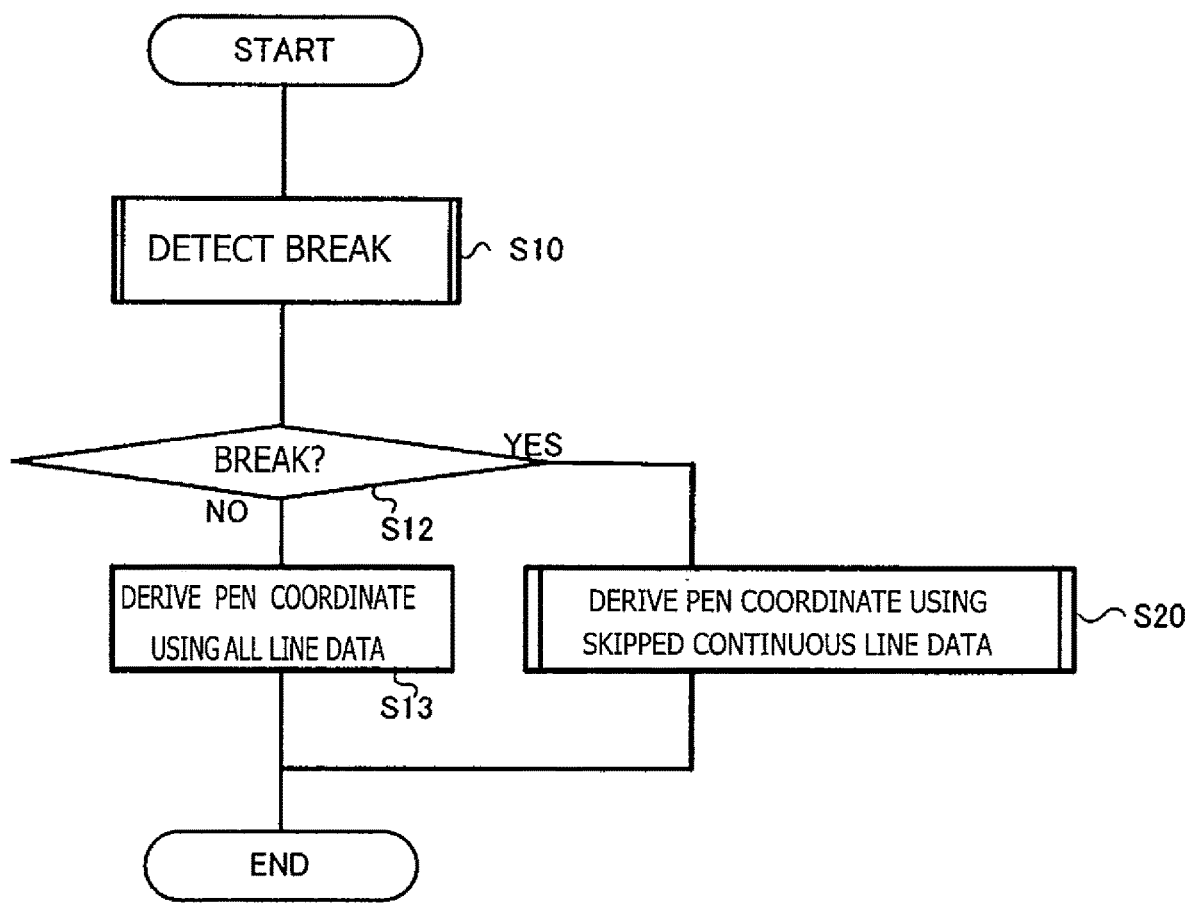
FIG. 2 is a flowchart illustrating overall operation of a position detection method used by the position detection circuit illustrated in FIG. 1.

FIG. 2 is a flowchart illustrating overall operation of the position detection method used by the position detection circuit 18 illustrated in FIG. 1. The position detection circuit 18 performs a break detection process (S10). In the case where no break is detected (NO at S12), the position detection circuit 18 performs a pen coordinate derivation process using all line data. In the case where a break is detected (YES at S12), the position detection circuit 18 performs the pen coordinate derivation process (S20) using skipped continuous line data. This operation may be performed by a single processor (position detection circuit 18) or a plurality of processors in a coordinated manner.

s[Description of the Break Detection Process]
<Specific Operation>

Figure 3:
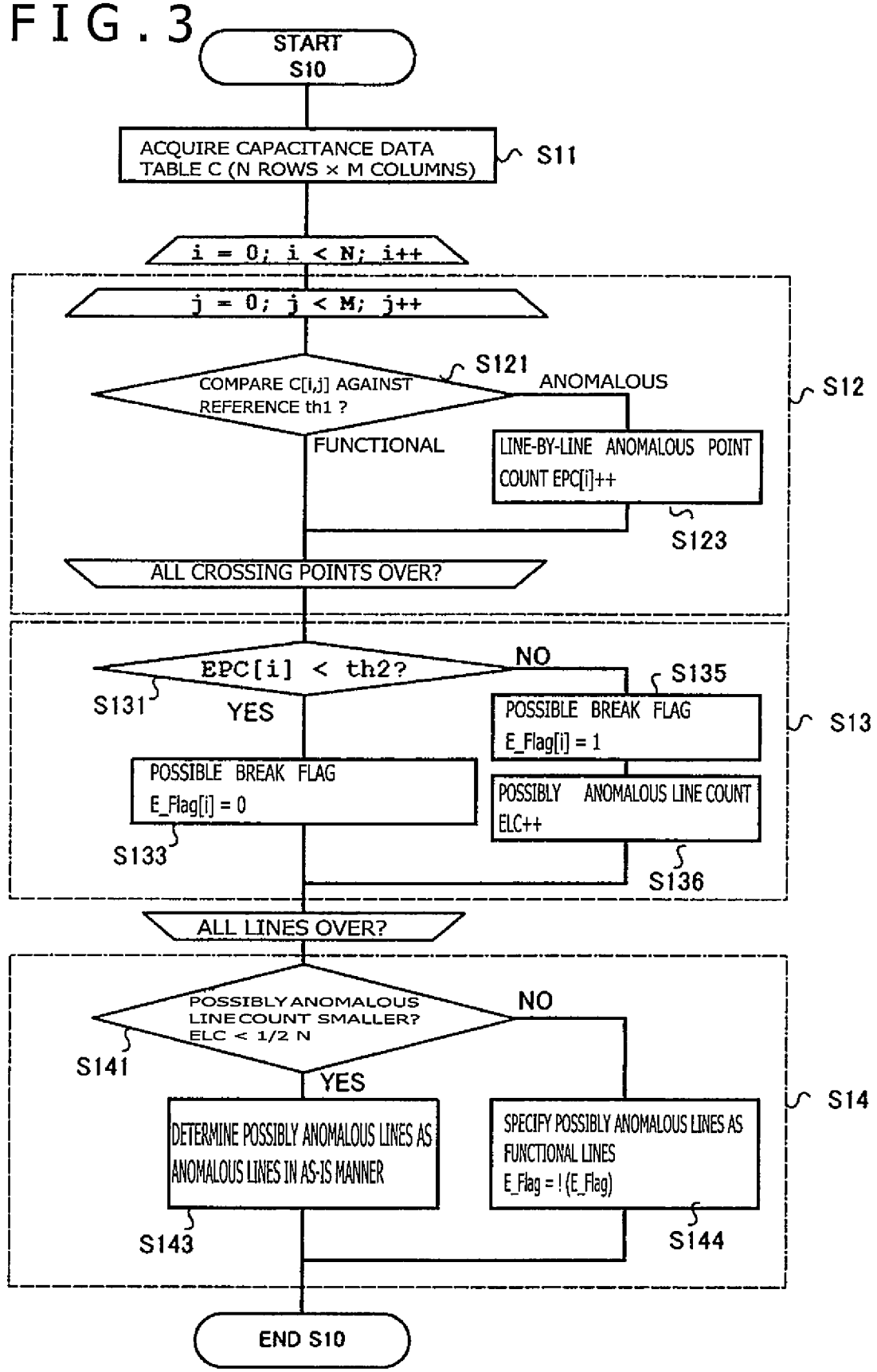
FIG. 3 is a detailed flowchart of a break detection process at S10 of FIG. 2.

FIG. 3 is a detailed flowchart of the break detection process at S10 of FIG. 2.

At S11, a capacitance data table C including capacitance values at N×M crossing points is acquired. The capacitance data table C is a table that includes values as illustrated in FIG. 4 which will be described later.

Next, at S12, a line-by-line anomalous point count EPC in an ith row line is detected. This detection may be conducted, for example, by comparing each of capacitance values at the M crossing points included in the ith row line against a given threshold th1 (first threshold) and counting the number of anomalous points where the capacitance value is greater than the threshold th1. This comparison may be made by comparing a difference in capacitance value between the current row line and its adjacent row line (e.g., i-1th row line) against the threshold th1 or against a reference value at the crossing point at that point in time. A line-by-line anomalous point count EPC (i), the number of crossing points where an anomalous capacitance value was found, is calculated by this comparison (S123).

Next, at S13, a provisional decision is made as to whether there is a break in the ith row line. at S131, it is decided whether the line-by-line anomalous point count EPC (i) is smaller than a given count th2. In the case where the line-by-line anomalous point count EPC (i) is smaller (YES at S131), a possible break flag E_Flag for that row is set to a value indicating that the ith row line has no break (S133). In the case where the line-by-line anomalous point count EPC (i) is larger (NO at S131) as a result of the decision, the possible break flag E_Flag for that row is set to a value indicating that the ith row line possibly has a break (S135). In this case, a possibly anomalous line count ELC for the N rows as a whole is incremented (S136).

FIGS. 4 and 5 are diagrams illustrating examples of results acquired by a provisional decision process, respectively. Specifically, in a touch panel having row lines X0 to X14 and column lines Y0 to Y14, examples of capacitance values acquired at the respective crossing points and examples of the line-by-line anomalous point counts EPC, the possibly anomalous line counts ELC, and the possible break flag E_Flag values acquired by the above process are illustrated. A capacitance value smaller than 19 (second threshold) is decided to be anomalous.

In the example illustrated in FIG. 4, the row line Y8 whose capacitance values have been decided to be anomalous at 15 points is temporarily decided to be a possibly anomalous line. The possibly anomalous line count ELC in the row direction is temporarily decided to be '1.' In the example illustrated in FIG. 5, the row lines Y8 to Y10 whose capacitance values have been decided to be anomalous at 15 points are temporarily decided to be possibly anomalous lines. The possibly anomalous line count ELC in the row direction is temporarily decided to be '3', and the possibly anomalous line count ELC in the column direction is temporarily decided to be '1.'

Referring back to FIG. 3, at S14, a majority decision process is performed to determine whether the possibly anomalous lines found as a result of a provisional decision are anomalous. It is decided whether the possibly anomalous line count ELC is smaller than a majority of the row line count N (or column line count M) (S141). In the case where the possibly anomalous line count ELC is smaller than the majority (YES S141) as a result of the decision, the possibly anomalous lines are determined as anomalous lines in an 'as-is' manner. In the case where the possibly anomalous line count ELC is larger than the majority (NO at S141) as a result of the decision, the possibly anomalous lines are determined as functional lines (9 lines from Y3 to Y11 in the example illustrated in FIG. 6), and the lines that have been temporarily decided to be functional lines (6 lines from Y0 to Y2 and from Y12 to Y14) are determined as anomalous lines. This process switches, for example, between lines temporarily decided to be anomalous and lines decided to be functional by inverting the possible break flag E_Flag for the lines temporarily decided to be anomalous. The pen coordinate derivation process at S20 which will be described later is performed on the basis of the anomalous lines determined.

Figure 6:
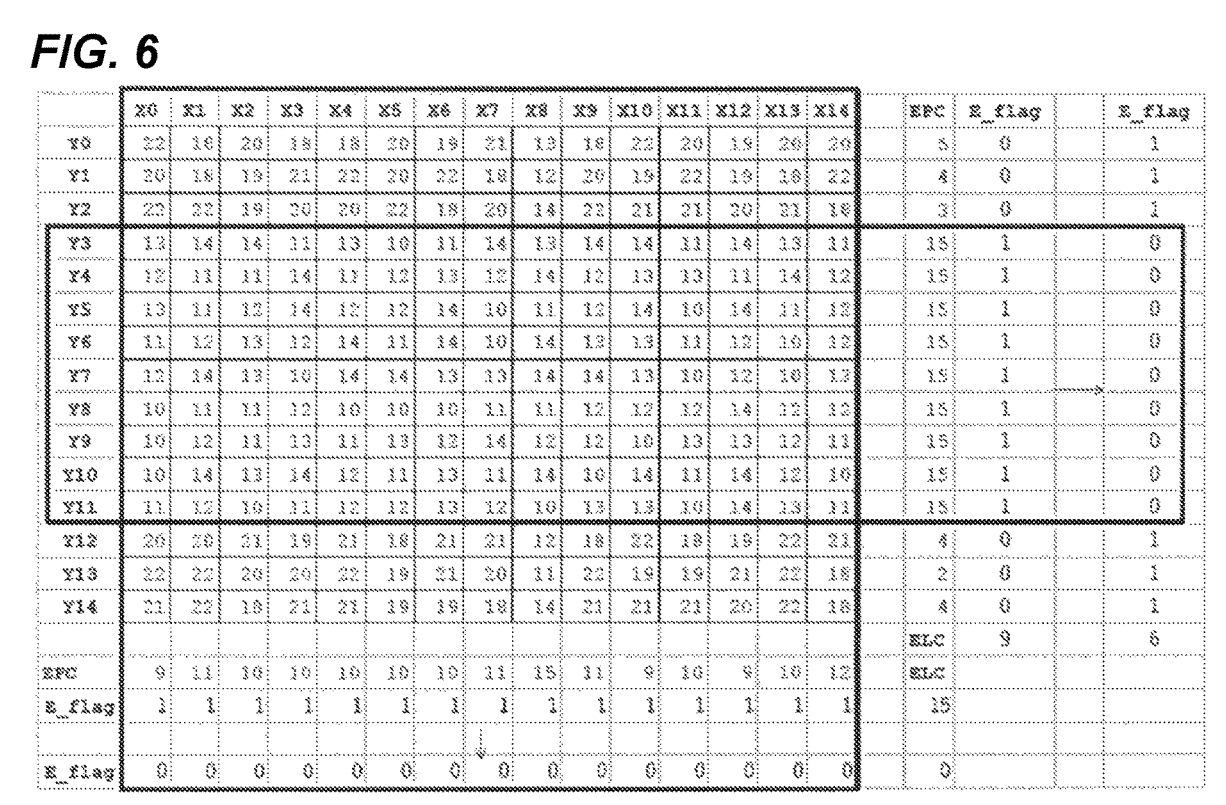

FIG. 6 is a diagram illustrating an example of results acquired by the majority decision process. Although the row lines Y3 to Y11 are temporarily decided to be possibly anomalous for the time being, '9', the number of possibly anomalous lines, is a majority of '15', the total number of row lines. In the case where there is a possibility that an overall mechanism of the touch sensor 16 as a whole may have changed or in the case where differences between adjacent lines are used as capacitance values, such a condition occurs, and it is difficult to determine which group, either the group of lines temporarily decided to be possibly anomalous or the group of lines temporarily decided to be functional, gives correct reading. In order to continue with detection operation without terminating touch detection operation even in such a situation, two groups of lines, one having row lines from Y0 to Y2 and from Y12 to Y14 and another having row lines Y3 to Y11 that were temporarily decided to be possibly anomalous for the time being, are switched by using outputs of the row lines Y3 to Y11 assuming that it is the lines from Y0 to Y2 and from Y12 to Y14 that have a break.

<Advantageous Effect of the Break Detection Process>

The position detection circuit 18 is connected to the capacitive touch sensor 16 that includes the plurality of line electrodes 16x and 16y arranged in a two-dimensional lattice pattern and performs an acquisition (S11) that acquires capacitance-related detection values at the crossing points of the line electrodes 16x and 16y in association with crossing point positions, a calculation (S12) that calculates the number of crossing points where the detection value is smaller than the first threshold for each of the line electrodes 16x and 16y, and a decision (S13, S14) that decides that the line electrodes 16x and 16y the number of whose crossing points calculated is greater than the second threshold are anomalous or possibly anomalous.

The anomalous or possibly anomalous line electrodes 16x and 16y are identified by performing a calculation process and a threshold process on the detection value for each crossing point that can be acquired under normal usage conditions. As a result, whether the line electrodes 16x and 16y are anomalous may be detected by a simple method without displaying a special inspection pattern.

In the decision at (S14), in the case where the line electrodes 16x (16y) included in one direction of the two-dimensional lattice are a population and in the where the number of line electrodes 16x (16y) that are not possibly anomalous is a majority of all samples of the population, the line electrodes 16x (16y) extracted as possibly anomalous may be decided to be anomalous, and in the case where the number of line electrodes 16x (16y) that are possibly anomalous is a majority of all samples of the population, the line electrodes 16x (16y) that were not extracted as possibly anomalous may be decided to be anomalous. The likelihood of acquiring appropriate decision results as a population as a whole may increase by making a secondary decision on the basis of a majority decision principle.

[Description of the Pen Coordinate Derivation Process]

<Problem Arising from Break>

A description will be given next of the pen coordinate derivation process. The pen coordinate derivation process derives a two-dimensional position in the row and column directions by detecting a pen signal sent from the electronic pen 12 with the line electrodes 16x and 16y. A description will be given below by taking, for example, the state in which, of the row lines Y0 to Y15, the electronic pen 12 is located near the row line Y8 for position detection in the row direction. Although the pen coordinate derivation process in the row direction will be described below, it is a matter of course that a similar process may also be performed in the column direction.

Figure 7A:
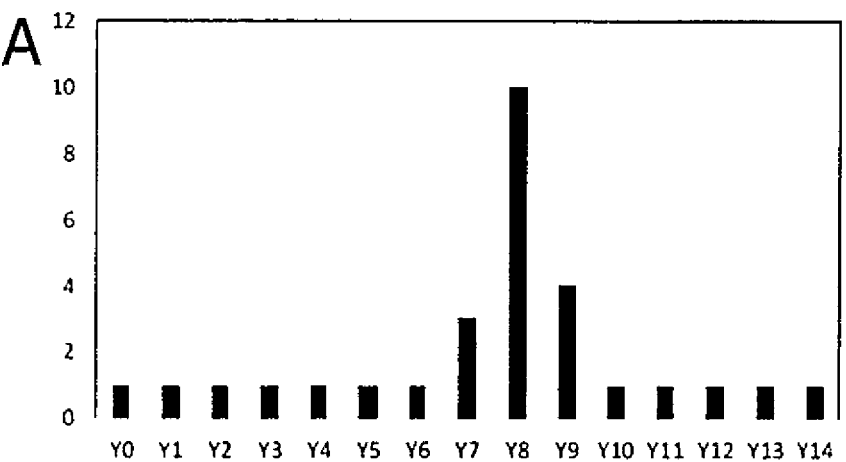
FIGS. 7A to 7C are diagrams illustrating examples of signal level distributions in respective row lines.
Figure 7B:
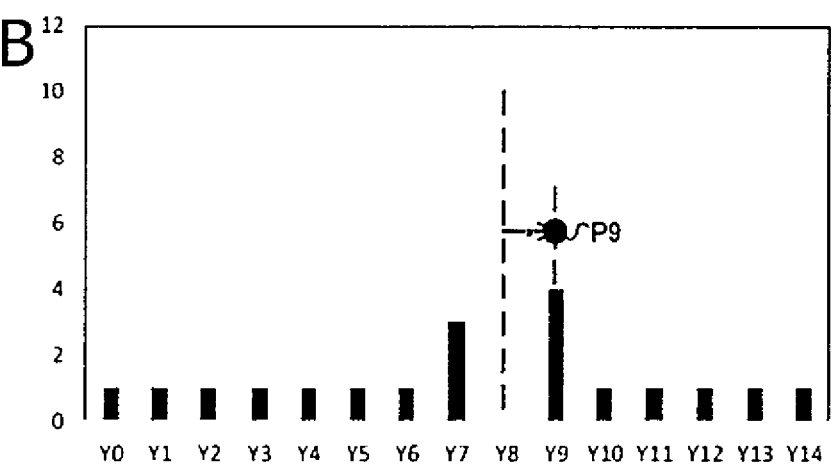
Figure 7C:
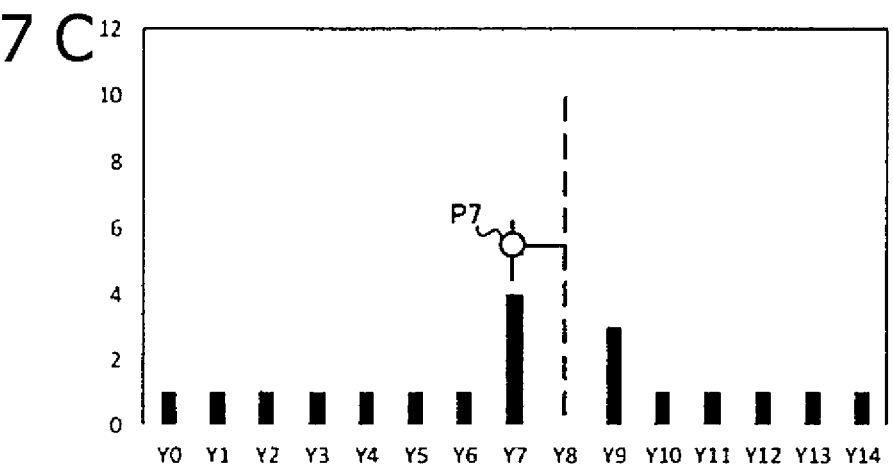

FIGS. 7A to 7C are diagrams illustrating examples of signal level distribution in each row line. FIG. 7A is a diagram illustrating an example of signal level distribution in each row line in the case where no break is detected in any of the row lines Y0 to Y15 (NO at S12 of FIG. 2).

The signal level detected in each line reached its peak at the line Y8, its second highest level at the line Y9, and its third highest level at the line Y7. In the pen coordinate derivation process, a desired approximation or interpolation is performed by using a signal level distribution centered around the line Y8 where a peak was recorded and spanning the lines Y7 and Y9, and then a maximum signal level coordinate is derived on the basis of the acquired distribution (curve or curved surface), and a pen coordinate is output as a Y-coordinate position. A variety of techniques including a cubic spline function and a B-spline function are used as an approximation or interpolation algorithm.

FIGS. 7B and 7C are distribution diagrams illustrating examples of distribution of signal levels detected in the respective lines in the case where there is a break in the line Y8 with the electronic pen 12 located at the position of the line Y8. Because the line Y8 has a break, one of the signal levels detected at the line Y9 or Y7 takes on the highest peak, and the other signal level takes on the second highest peak.

Figure 8A:
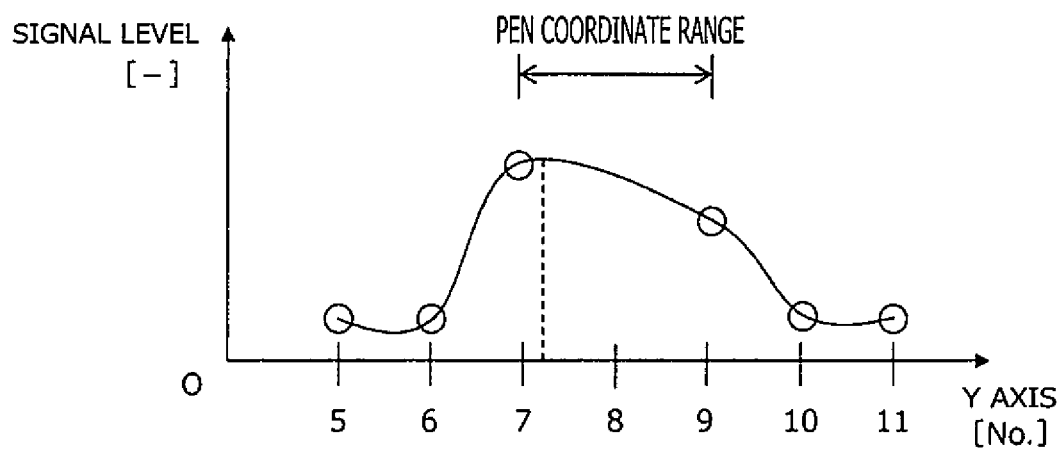
FIG. 8A is a diagram illustrating an example of an interpolation result using cubic spline interpolation.

FIG. 8A is a diagram illustrating an example of an interpolation result using cubic spline interpolation. Because the Y8 signal level is missing, data point density (spatial resolution) between the lines Y7 and Y9 is relatively "sparse." For this reason, in the case where there is a complete match in signal level between the lines Y7 and Y9, the line Y8 is located at the maximum position of an interpolation curve. However, if there is a difference in signal level between the two, the maximum position of the interpolation curve tends to move closer to either the line Y7 or Y9 (whichever is higher in signal level). That is, the maximum position may vary significantly in the range between the lines Y7 and Y9 (two pitches worth of range).

As a result, in the example illustrated in FIG. 7B, although the electronic pen 12 is actually located at the Y8 position, a position near a position P9 (black circle position) of the line Y9 where the peak signal level was acquired is output as a coordinate (hereinafter also referred to as a "pen coordinate") indicating the position of the electronic pen 12. In the example illustrated in FIG. 7C, a position near a position P7 (white circle position) is output as a pen coordinate. There is not a significant difference between the signal levels detected in the lines Y7 and Y9 in FIGS. 7B and 7C. The reason for this is that both positions differ from the position where the peak value is supposed to be located. In such a case, a magnitude relationship between the signal level detected in the line Y7 and the signal level detected in the line Y9 changes easily due, for example, to inclination of the electronic pen 12 or shake in the row direction, and these may occur alternately.

Figure 8B:
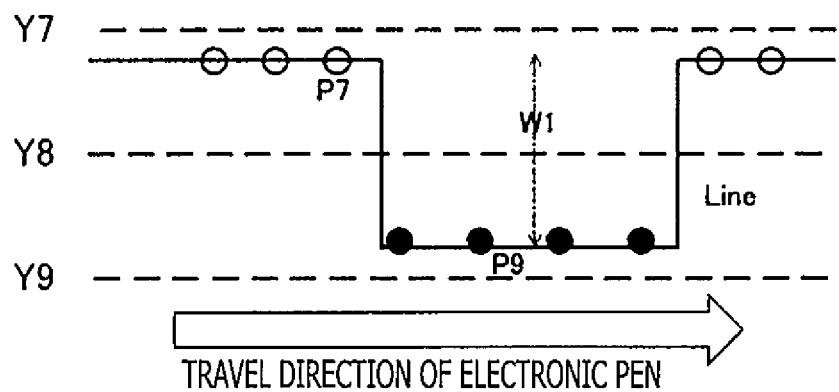
FIG. 8B is a diagram schematically illustrating a locus of a pen coordinate associated with movement of an electronic pen.

FIG. 8B is a diagram schematically illustrating a locus of the pen coordinate associated with movement of the electronic pen 12. We assume here that the pen is moved in the direction in which the row line Y8 having a break extends. If the magnitude relationship in signal level changes because of the reason described above, the pen coordinate initially located near the position P7 (white circle) moves to a position near the position P9 (black circle) thereafter and then back to where it was near the position P7, fluctuating with an amplitude W1. Even if a provisional signal level value (e.g., average of the signal levels acquired at the lines Y7 and Y9) is given to the Y8 position, this problem remains unsolved. If breaks occur in a plurality of consecutive lines, this amplitude W1 will increase further.

<Specific Operation>

FIG. 9 is a detailed flowchart of the pen coordinate derivation process using skipped continuous line data performed at S20 of FIG. 2.

A connection relationship change process is performed (S210). The term "connection relationship" refers to a correspondence between an actual data position and a position where data is supposed to be. This change process rearranges data such that the signal level values acquired at the row lines Y0 to Y14 skip the break positions and, at the same time, remain adjacent to each other. That is, this change process corresponds to a skipped continuous line data acquisition process for acquiring skipped continuous line data.

Figure 10:
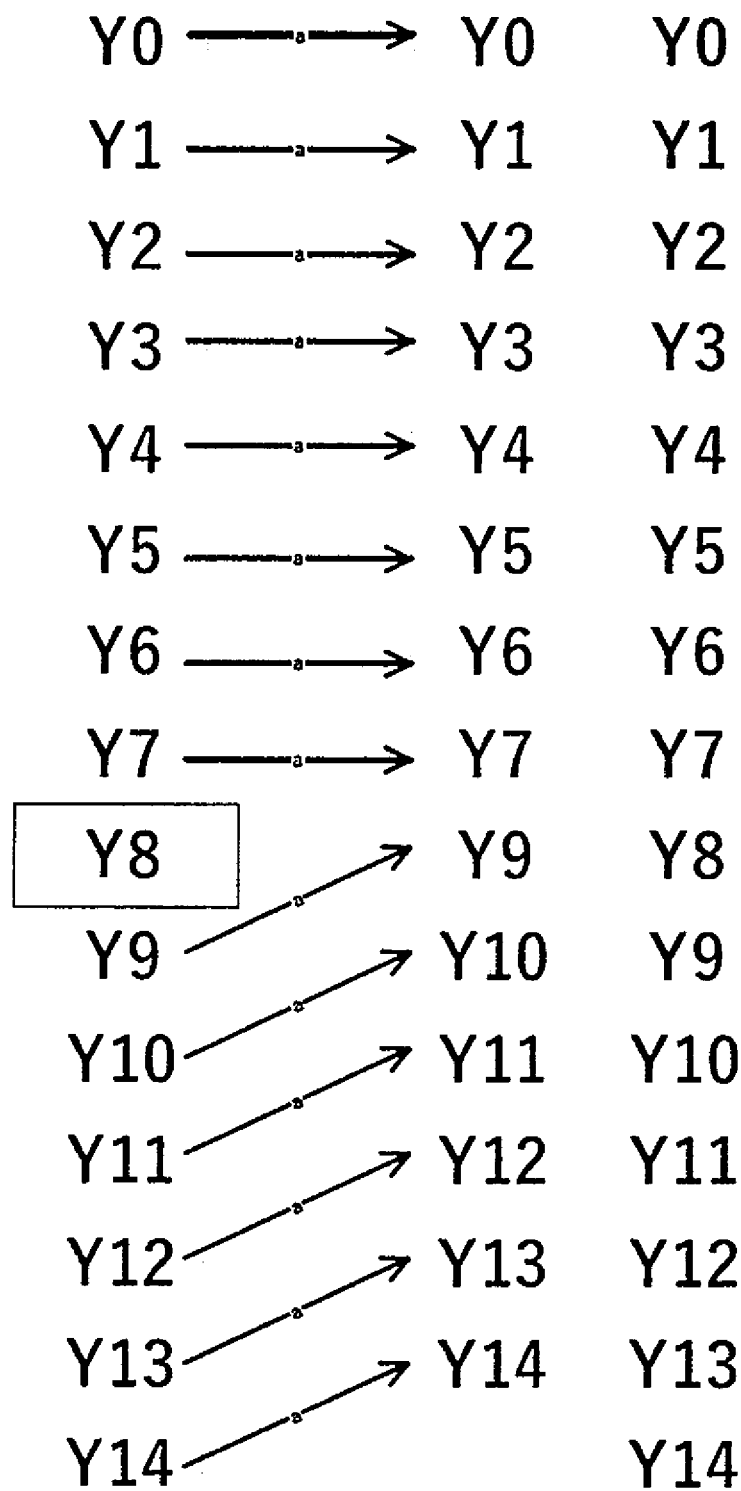
FIG. 10 is a diagram illustrating a relationship between signal level values acquired by a skipped continuous line data acquisition process.

FIG. 10 is a diagram illustrating a relationship between signal level values acquired by the skipped continuous line data acquisition process. For example, in the case where it is decided that there is a break in the row line Y8, a data address relationship is changed such that readout of data from a Y8 address position is skipped and that data stored in a next Y9 address is read. This "skipping" is equivalent to an address conversion process for moving the corresponding position of the line.

Next, the pen coordinate derivation process is performed using skipped continuous line data supplied on the basis of this connection relationship. The pen coordinate derivation process is the same as the pen coordinate derivation process performed at S13 of FIG. 2 except that data has been changed. That is, the signal level data acquired at the line Y9 is actually used for the Y8 position for processing.

Figure 11A:
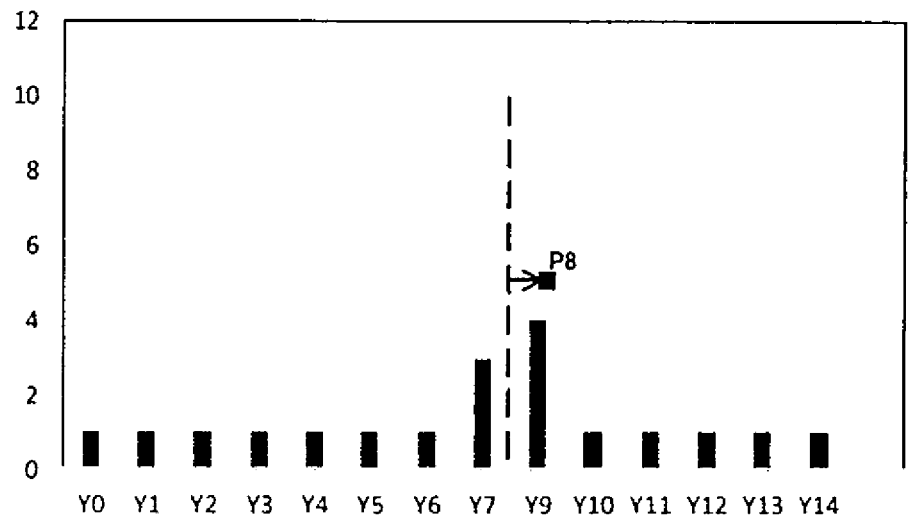
FIGS. 11A and 11B are diagrams illustrating examples of signal level distributions in respective row lines.
Figure 11B:
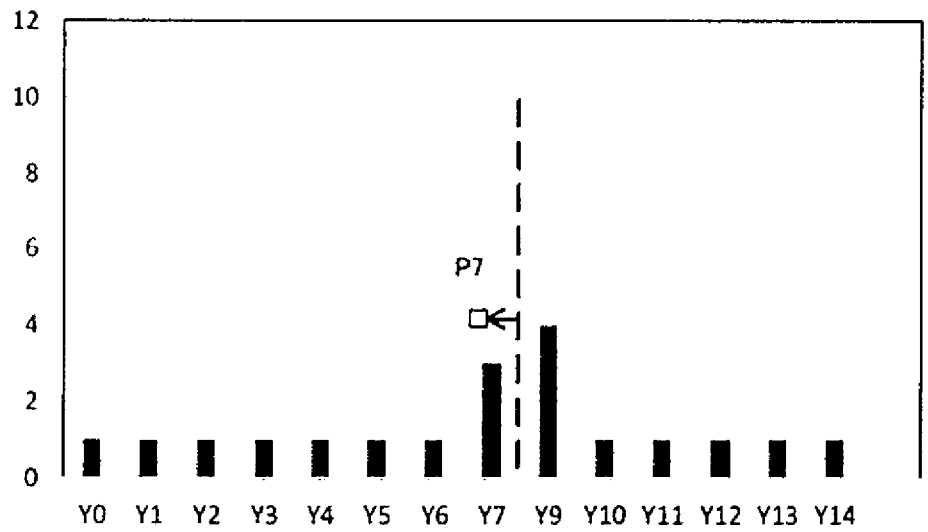

FIGS. 11A to 12B are diagrams describing an advantageous effect produced by the position derivation process using these skipped continuous lines. In the example of FIG. 11A, a position near the position P8 (black rectangle) of the line Y8 where the peak was detected (actually, Y9 data) is output as a pen coordinate. In the example of FIG. 11B, a position near the position P7 (white rectangle) of the line Y7 where the peak was detected is output as a pen coordinate.

Figure 12A:
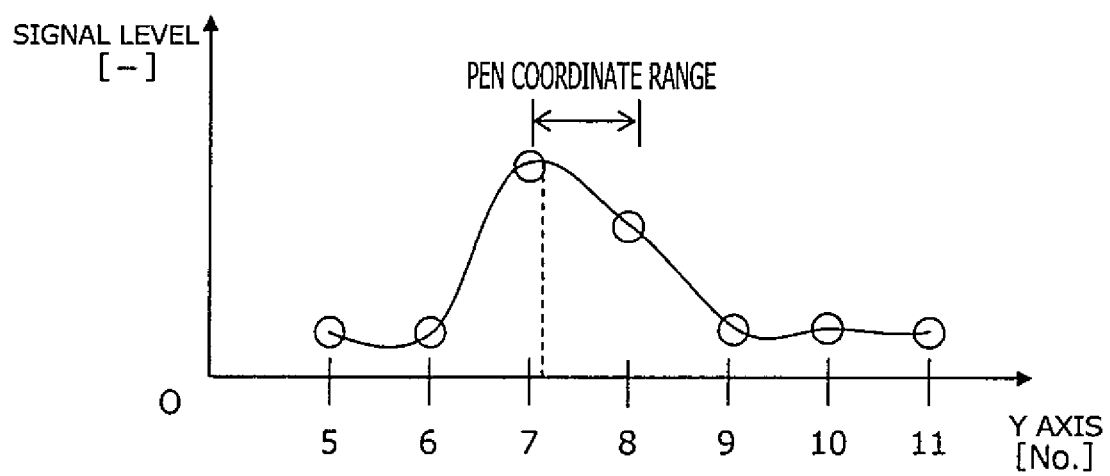
FIG. 12A is a diagram illustrating an example of an interpolation result using cubic spline interpolation.

FIG. 12A is a diagram illustrating an example of an interpolation result using cubic spline interpolation. Because the Y8 signal level has been skipped, the spatial resolution between the lines Y7 and Y8 (actually, Y9 data) is equivalent to that in the case where there was no break. That is, even in the case where there is a difference in signal level between Y7 and Y9, the fluctuation of the maximum position in the interpolation curve may fall within the range between Y7 and Y8 (one pitch worth of range).

Figure 12B:
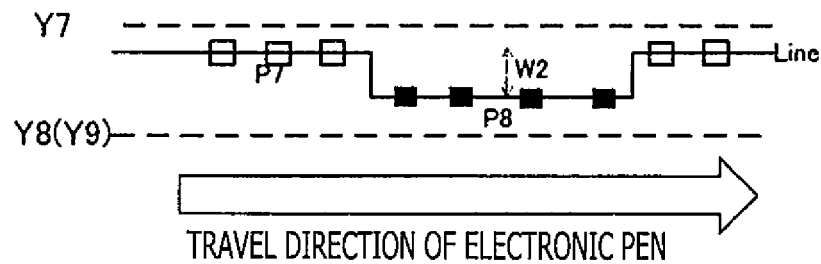
FIG. 12B is a diagram schematically illustrating a locus of a pen coordinate associated with movement of an electronic pen.

FIG. 12B is a diagram schematically illustrating a locus of a pen coordinate associated with movement of the electronic pen 12. We assume that the electronic pen 12 is moved in the direction in which the row line Y8 having a break extends as done in FIG. 8B. If the magnitude relationship in signal level changes because of the reason described above, the pen coordinate initially located near the position P7 (white rectangle) moves to a position near the position P8 (black rectangle) rather than the position P9. Therefore, the amplitude W1 illustrated in FIG. 8B has been reduced by about one pitch to an amplitude W2, thereby keeping, to a minimum, an up-down fluctuation of a drawn line like a barcode.

The pen coordinate acquired by skipped continuous data has a deviation at the line Y8, the break position. In such a case, a decision may be made as to whether the pen coordinate is before or after the break position, and the correction may be switched depending on whether the pen coordinate is before or after the break position.

Figure 13:
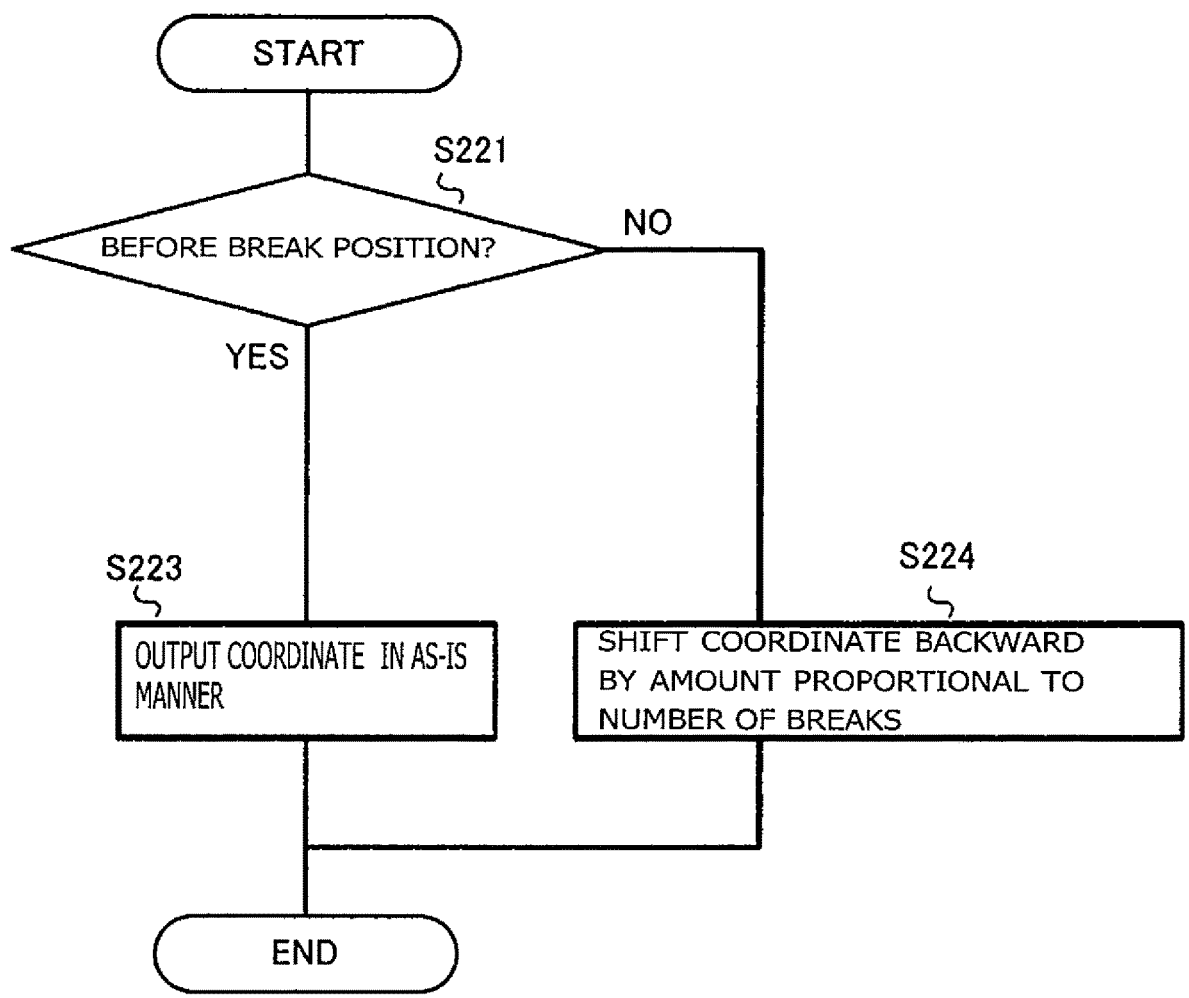
FIG. 13 is a flowchart of a correction switching process in accordance with skipping of a break.

FIG. 13 is a flowchart of a correction switching process in accordance with skipping of a break.

At S221, it is decided whether the target position is located before or after the break position (whether the target output position will be affected). For example, the row lines Y0 to Y7 are decided to be located before the Y8 break position. In the case where the target output position is located before the break position (YES at S221), the derived pen coordinate is output in an 'as-is' manner (S223).

Figure 14A:
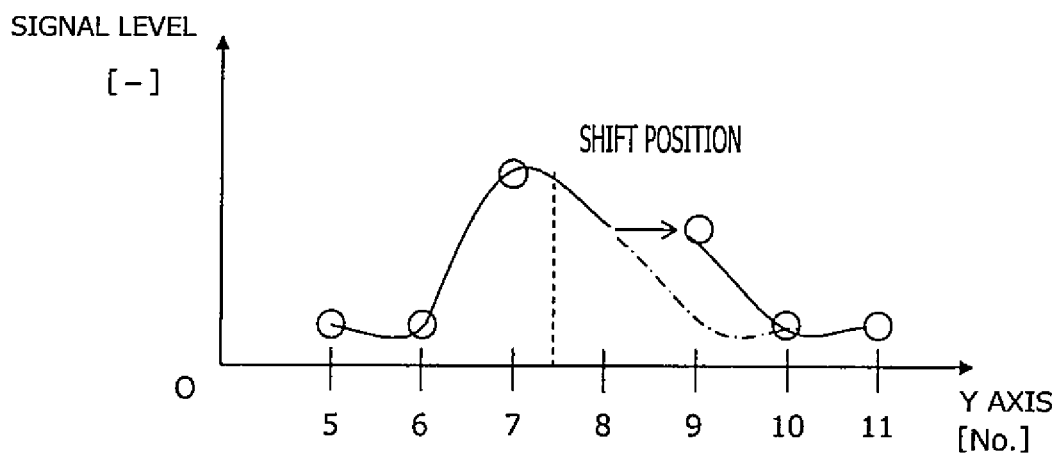
FIGS. 14A and 14B are diagrams illustrating an example of a pen coordinate correction method.
Figure 14B:
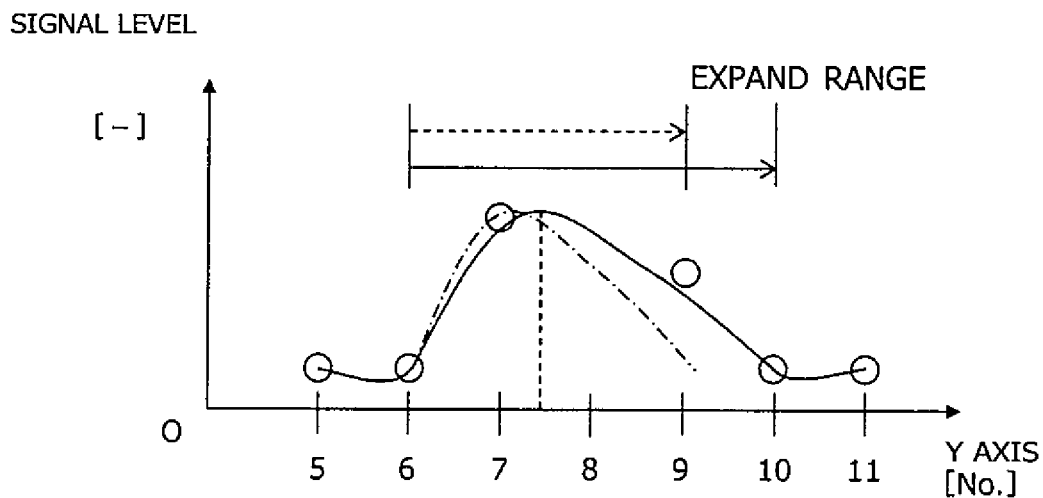

In the case where the target output position is located after the break position (NO at S221), the derived pen coordinate is shifted backward by an amount proportional to the number of breaks and output (S223). For example, in the case where there is a break in one row line, the pen coordinate shifted backward by one pitch is output, and in the case where there are breaks in three row lines, the pen coordinate shifted backward by three pitches is output. This keeps, to a minimum, any deviation of a detection position resulting from skipping at the positions that are supposedly unaffected. The pen coordinate may be corrected by shifting the position as described above (refer to FIG. 14A) or by expanding the range of a given interval (Y6 to Y9) (refer to FIG. 14B).

<Advantageous Effects of the Pen Coordinate Derivation Process>

As described above, the position detection circuit 18 may be a circuit connected to the capacitive touch sensor 16 that includes the plurality of line electrodes 16x and 16y arranged in a two-dimensional lattice pattern and performs an acquisition (S11) that acquires capacitance-related detection values at the crossing points of the line electrodes 16x and 16y in association with crossing point positions, a decision (S14) that decides whether the line electrodes 16x and 16y are functional, and a derivation (S20) that performs approximation or interpolation using a plurality of data points representing a distribution of detection values and derives a detection position on the basis of the maximum coordinate of the detection values in the acquired distribution. In the derivation, approximation or interpolation may be performed by skipping the data points corresponding to the line electrodes 16x and 16y that are decided to be anomalous.

Such a configuration keeps, to a minimum, local reduction in spatial resolution caused by the anomaly of the line electrodes 16x and 16y, thereby maintaining the accuracy for deriving detection positions by approximation or interpolation. This keeps, to a minimum, possible fluctuation in the direction of line width during touch operation along a specific direction.

In the derivation, a detection position may be derived by correcting the maximum coordinate in accordance with the number of data points skipped. This keeps, to a minimum, a deviation of the detection position caused by skipping.

In the acquisition, capacitance-related detection values may be acquired between the electronic pen 12 that writes with a line width narrower than the pitch between the line electrodes 16x (16y) and the touch sensor 16. In the case where the electronic pen 12 having high spatial resolution of a pointing position is used, the required accuracy for detecting the pen coordinate becomes all the higher. As a result, the above advantageous effect of reducing the fluctuation will manifest itself more significantly. It is to be noted that the embodiment of the present disclosure is not limited to the foregoing embodiment, and that various changes can be made without departing from the spirit of the present disclosure.

What is claimed is:

1. A position detection circuit connected to a capacitive touch sensor that includes a plurality of line electrodes arranged in a two-dimensional lattice pattern, the position detection circuit comprising:
   at least one processor device; and
   at least one memory device storing processor-executable instructions which, when executed by the processor device, cause the position detection circuit to:
      acquire capacitance-related detection values at crossing points of the line electrodes in association with positions of the crossing points;
      calculate a number of the crossing points at which a detection value is smaller than a first threshold, for each of the line electrodes; and
      determine that one or more of the line electrodes is anomalous or possibly anomalous, wherein the calculated number of the crossing points at which the detection value is smaller than the first threshold for each of the one or more of the line electrodes determined to be anomalous or possibly anomalous is greater than a second threshold, and wherein, in a case where a number of the line electrodes that are not possibly anomalous is a majority of the line electrodes included in one direction of the two-dimensional lattice, the line electrodes determined as possibly anomalous are determined to be anomalous.

2. The position detection circuit of claim 1, wherein, in a case where a number of the line electrodes that are possibly anomalous is a majority of the line electrodes included in one direction of the two-dimensional lattice, one or more of the line electrodes that were not determined as possibly anomalous are determined to be anomalous.

3. The position detection circuit of claim 1, wherein the instructions, when executed by the processor device, further cause the position detection circuit to:
   approximate or interpolate using a plurality of data points representing a distribution of detection values and derive a detection position based on a maximum coordinate of the detection values in the acquired distribution, wherein
   approximation or interpolation is performed by skipping the data points corresponding to the line electrodes that are determined to be anomalous.

4. The position detection circuit of claim 3, wherein the detection position is derived by correcting the maximum coordinate in accordance with a number of data points skipped.

5. The position detection circuit of claim 3, wherein capacitance-related detection values are acquired between an electronic pen that writes with a line width narrower than a pitch between the line electrodes and the touch sensor.

6. The position detection circuit of claim 1, wherein the instructions, when executed by the processor device, further cause the position detection circuit to:
   derive coordinates of an object on the capacitive touch sensor using the capacitance-related detection values at crossing points of the line electrodes other than the one or more of the line electrodes determined to be anomalous or possibly anomalous.

7. A position detection method using a capacitive touch sensor that includes a plurality of line electrodes arranged in a two-dimensional lattice pattern, the position detection method comprising:
   acquiring, by one or more processors, capacitance-related detection values at crossing points of the line electrodes in association with positions of the crossing points;
   calculating, by the one or more processors, a number of the crossing points at which a detection value is smaller than a first threshold, for each of the line electrodes; and
   determining, by the one or more processors, that one or more of the line electrodes is anomalous or possibly anomalous, wherein the calculated number of the crossing points at which the detection value is smaller than the first threshold for each of the one or more of the line electrodes determined to be anomalous or possibly anomalous is greater than a second threshold, and wherein, in a case where a number of the line electrodes that are not possibly anomalous is a majority of the line electrodes included in one direction of the two-dimensional lattice, the line electrodes determined as possibly anomalous are determined to be anomalous.

8. The position detection method of claim 7, wherein, in a case where a number of the line electrodes that are possibly anomalous is a majority of the line electrodes included in one direction of the two-dimensional lattice, one or more of the line electrodes that were not determined as possibly anomalous are decided to be anomalous.

9. The position detection method of claim 8, further comprising:
   approximating or interpolating using a plurality of data points representing a distribution of the detection values and deriving a detection position based on a maximum coordinate of the detection values in the acquired distribution, wherein
   in the deriving, approximating or interpolating is performed by skipping the data points corresponding to the line electrodes that are determined to be anomalous.

10. The position detection method of claim 9, wherein
in the deriving, the detection position is derived by
correcting the maximum coordinate in accordance with
a number of data points skipped.

11. The position detection method of claim 9, wherein
in the acquiring, capacitance-related detection values are
acquired between an electronic pen that writes with a
line width narrower than a pitch between the line
electrodes and the touch sensor.

12. The position detection method of claim 7, further comprising:
deriving coordinates of an object on the capacitive touch
sensor using the capacitance-related detection values at
crossing points of the line electrodes other than the one
or more of the line electrodes determined to be anomalous or possibly anomalous.

* * * * *